US010237150B2

(12) United States Patent
Morris

(10) Patent No.: US 10,237,150 B2
(45) Date of Patent: *Mar. 19, 2019

(54) VISUALIZING REACH OF POSTED CONTENT IN A SOCIAL NETWORKING SYSTEM

(71) Applicant: Facebook, Inc., Menlo Park, CA (US)

(72) Inventor: Robyn David Morris, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 15/194,358

(22) Filed: Jun. 27, 2016

(65) Prior Publication Data

US 2016/0308740 A1   Oct. 20, 2016

Related U.S. Application Data

(63) Continuation of application No. 13/689,441, filed on Nov. 29, 2012, now Pat. No. 9,430,439.

(51) Int. Cl.
*G06F 15/16* (2006.01)
*G06F 3/048* (2013.01)
(Continued)

(52) U.S. Cl.
CPC ............ *H04L 43/045* (2013.01); *G06F 3/048* (2013.01); *G06F 15/16* (2013.01); *G06Q 50/01* (2013.01); *H04L 67/22* (2013.01)

(58) Field of Classification Search
CPC . G06F 3/00; G06F 15/16; G06F 17/00; G06F 3/048; G06Q 30/00; G06Q 10/00; H04L 67/22
See application file for complete search history.

(56) References Cited

U.S. PATENT DOCUMENTS 7,346,606 B2    3/2008  Bharat
7,720,707 B1    5/2010  Mowry
(Continued)

FOREIGN PATENT DOCUMENTS

JP    2004-171042 A    6/2004
JP    2008-146655       6/2008
(Continued)

OTHER PUBLICATIONS

Canadian Intellectual Patent Office, Office Action, Canadian Patent Application No. 2,848,714, dated Jul. 31, 2017, six pages.
(Continued)

*Primary Examiner* — Hugo Molina
(74) *Attorney, Agent, or Firm* — Fenwick & West LLP

(57) ABSTRACT

Effects of content communications propagated to users of a social networking system may be tracked and measured by the social networking system. Identifiers of content presented to users within a time period before the users interact with the content are recorded. As users interact with the content, additional data describing the interactions with the content and the users interacting with the content are stored. Various metrics may be determined from the data describing interactions with the content. For example including virality metrics and reach metrics, may be determined and presented to the user that posted the content.

16 Claims, 5 Drawing Sheets

(51) Int. Cl.
*G06F 3/00* (2006.01)
*H04L 12/26* (2006.01)
*G06Q 50/00* (2012.01)
*H04L 29/08* (2006.01)

(56) References Cited

U.S. PATENT DOCUMENTS

| | | | |
|---|---|---|---|
| 8,190,711 B1* | 5/2012 | Borodich | H04L 67/22 |
| | | | 709/219 |
| 8,548,855 B2 | 10/2013 | Svendsen et al. | |
| 8,548,918 B1* | 10/2013 | Amidon | G06Q 20/123 |
| | | | 705/50 |
| 2003/0001846 A1 | 1/2003 | Davis et al. | |
| 2005/0131762 A1 | 6/2005 | Bharat et al. | |
| 2007/0239517 A1 | 10/2007 | Chung et al. | |
| 2008/0059992 A1* | 3/2008 | Amidon | G06Q 30/0201 |
| | | | 725/25 |
| 2008/0201225 A1 | 8/2008 | Maharajh et al. | |
| 2008/0222531 A1* | 9/2008 | Davidson | G06Q 10/107 |
| | | | 715/736 |
| 2008/0256233 A1 | 10/2008 | Hall et al. | |
| 2008/0275861 A1 | 11/2008 | Baluja et al. | |
| 2009/0027392 A1 | 1/2009 | Jadhav et al. | |
| 2009/0171748 A1 | 7/2009 | Aven et al. | |
| 2009/0171760 A1 | 7/2009 | Aarnio et al. | |
| 2009/0182589 A1 | 7/2009 | Kendall et al. | |
| 2009/0228296 A1 | 9/2009 | Ismalon | |
| 2009/0248535 A1 | 10/2009 | Fisher et al. | |
| 2009/0300009 A1 | 12/2009 | Rezaei et al. | |
| 2009/0307345 A1 | 12/2009 | Carter et al. | |
| 2010/0070876 A1 | 3/2010 | Jain et al. | |
| 2010/0185507 A1 | 7/2010 | Tokuda | |
| 2010/0205254 A1* | 8/2010 | Ham | G06O 10/10 |
| | | | 709/206 |
| 2010/0257054 A1 | 10/2010 | Martin et al. | |
| 2010/0318611 A1* | 12/2010 | Curtin | G06F 15/16 |
| | | | 709/206 |
| 2010/0332488 A1 | 12/2010 | Horvitz et al. | |
| 2011/0143811 A1 | 6/2011 | Rodriguez | |
| 2011/0202270 A1 | 8/2011 | Sharma et al. | |
| 2011/0225043 A1 | 9/2011 | Bhatia et al. | |
| 2011/0276504 A1 | 11/2011 | Pradeep et al. | |
| 2011/0295626 A1 | 12/2011 | Wei et al. | |
| 2012/0059700 A1 | 3/2012 | Darbyshire | |
| 2012/0059713 A1 | 3/2012 | Galas et al. | |
| 2012/0102021 A1 | 4/2012 | Hill et al. | |
| 2012/0150630 A1 | 6/2012 | Hicken et al. | |
| 2012/0158499 A1 | 6/2012 | Banadaki et al. | |
| 2012/0158630 A1* | 6/2012 | Zaman | G06Q 30/02 |
| | | | 706/21 |
| 2012/0163574 A1 | 6/2012 | Gundotra et al. | |
| 2012/0209920 A1 | 8/2012 | Neystadt et al. | |
| 2012/0221387 A1 | 8/2012 | Liu et al. | |
| 2012/0290373 A1 | 11/2012 | Ferzacca et al. | |
| 2013/0014223 A1 | 1/2013 | Bhatia et al. | |
| 2013/0024267 A1 | 1/2013 | Libenson et al. | |
| 2013/0054698 A1 | 2/2013 | Lee et al. | |
| 2013/0066706 A1 | 3/2013 | Wu et al. | |
| 2013/0066711 A1 | 3/2013 | Liyange et al. | |
| 2013/0104055 A1* | 4/2013 | Wattenberg | G06Q 50/01 |
| | | | 715/753 |
| 2013/0325665 A1 | 12/2013 | Shaffer et al. | |
| 2014/0089067 A1* | 3/2014 | Filev | G06Q 30/0207 |
| | | | 705/14.19 |
| 2014/0108531 A1* | 4/2014 | Klau | H04L 67/22 |
| | | | 709/204 |
| 2014/0133530 A1 | 5/2014 | Maguire | |

FOREIGN PATENT DOCUMENTS

| | | |
|---|---|---|
| JP | 2008-176570 | 7/2008 |
| JP | 2008-257512 A | 10/2008 |
| JP | 2008-305258 A | 12/2008 |
| JP | 2010-537323 | 12/2010 |
| JP | 2011-503701 | 1/2011 |
| KR | 10-0861799 B1 | 10/2008 |
| KR | 10-2012-0050939 A | 5/2012 |
| WO | WO 2012/088528 A1 | 6/2012 |
| WO | WO 2012/116236 A2 | 8/2012 |

OTHER PUBLICATIONS

State Intellectual Property Office of the People's Republic of China, Decision of Rejection, Chinese Patent Application No. 201280054995.9, dated Sep. 5, 2017, twelve pages.
Canadian Intellectual Property Office, Office Action, Canadian Patent Application No. 2,848,714, dated Jun. 21, 2018, seven pages.
European Patent Office, Extended European Search Report, EP Application No. 13194186.6, dated Mar. 19, 2014, seven pages.
Japanese Patent Office, Japanese Application No. 2014-529721, dated Aug. 2, 2016, five pages.
PCT International Search Report and Written Opinion, PCT Application No. PCT/US2013/071626, dated Mar. 14, 2014, 15 pages.
Australian Government, IP Australia, Patent Examination Report No. 1, Australian Application No. 2012304850, dated Sep. 28, 2016, three pages.
Canadian Patent Office, Office Action for CA Application No. 2,848,714, dated Sep. 7, 2016, seven pages.
Mexican Institute of Industrial Property, Office Action, Mexican Patent Application No. MX/a/2014/002789, dated Nov. 22, 2016, seven pages.
State Intellectual Property Office of the People's Republic of China, Second Office Action, Chinese Patent Application No. 2012800549959, dated Nov. 23, 2016, 15 pages.
Korean Intellectual Property Office, Office Action, Korean Patent Application No. 10-2014-7009022, dated Apr. 16, 2018, six pages.
European Patent Office, Examination Report, European Patent Application No. 13194186.6, dated May 2, 2017, eight pages.

* cited by examiner

126

128

VISUALIZING REACH OF POSTED CONTENT IN A SOCIAL NETWORKING SYSTEM

CROSS REFERENCE TO RELATED APPLICATIONS

This application is a continuation of U.S. application Ser. No. 13/689,441 filed on Nov. 29, 2012, which is related to U.S. application Ser. No. 13/229,515 filed on Sep. 9, 2011. The subject matter of the foregoing are incorporated herein by reference in their entirety.

BACKGROUND

This invention relates generally to social networking, and in particular to visualizing the reach of a content item in a social networking system.

Social networking system users become engaged with other social networking system users by sharing photos, real-time status updates, and playing social games. The amount of information gathered from social networking system users is staggering, as large amounts of information in the form of news articles, videos, photos, and game achievements shared with other users of the social networking system may be retained. Certain content posted to a social networking system may become "viral" as users share content with other social networking system users. But conventional social networking systems lack the capability to measure the "virality" of a content item as well as other metrics about content that may be useful for users to understand how their posted content is seen by others within the social networking system. In particular, conventional social networking systems are unable to fully track user interactions with the social networking system.

SUMMARY

Embodiments of the present disclosure allow tracking and measurement of effects of a content item and derivatives of the content item propagated to users of a social networking system. A user of the social networking system provides a content item to the social networking system for presentation to other social networking system users. After the social networking system presents the content item, the user providing the content item may request to visualize the reach of the posted content item, which describes presentation of the content item to social networking system users.

In an embodiment, after presenting a content item to social networking system users, the social networking system creates label objects and edge object tracking the content item and derivatives of the content item. When a request to visualize the reach of the posted content item is received, the social networking system retrieves the created label objects and edge objects and determines reach data from the retrieved label objects and edge objects. The reach data includes information identifying other users of the social networking system performing actions on the posted content item and on content derived from the posted content item, and may also include information describing the actions performed on the content item and its derivatives by the other users. The social networking system then provides the reach data to the device for presentation to the user requesting visualization of the content item reach.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Content items presented through a social networking system may encourage users to perform certain actions on the presented objects. Examples of content items include photos, videos, textual status updates, links to websites and user actions within and outside of a social networking system, may be shared by users with other users of a social networking system. Examples of actions performed by a user with a content item include expressing a preference of a page presented via the social networking system (i.e., users may "like" the page), sharing a content item with other social networking system users, or commenting on a content item. Each action performed by a social networking system user may be presented by the social networking system as a new content item. These new content items describing user actions may be described as "stories." These stories may be distributed to social networking system users through different communication channels, such as news feeds, posting on pages maintained by the social networking system, and sponsored stories.

Many different types of actions may be performed through a social networking system. Additional examples of actions include commenting on a photo album, transmitting messages between users, becoming a fan of a musician, joining an event, joining a group, or other similar actions. A user may perform actions with content items on the social networking system as well as other applications operating on the social networking system. Moreover, one or more derivatives of the original content item may propagate within the social networking system in addition to the original content item. A derivative of a posted content item is a version of the content item that has been modified some way by a user of the social networking system. For example, a user may post a content item (original content item), and a second user may re-post the content item; re-post the content item with added commentary, etc. The re-posted content item is a derivative of the original content item.

Figure 1A:
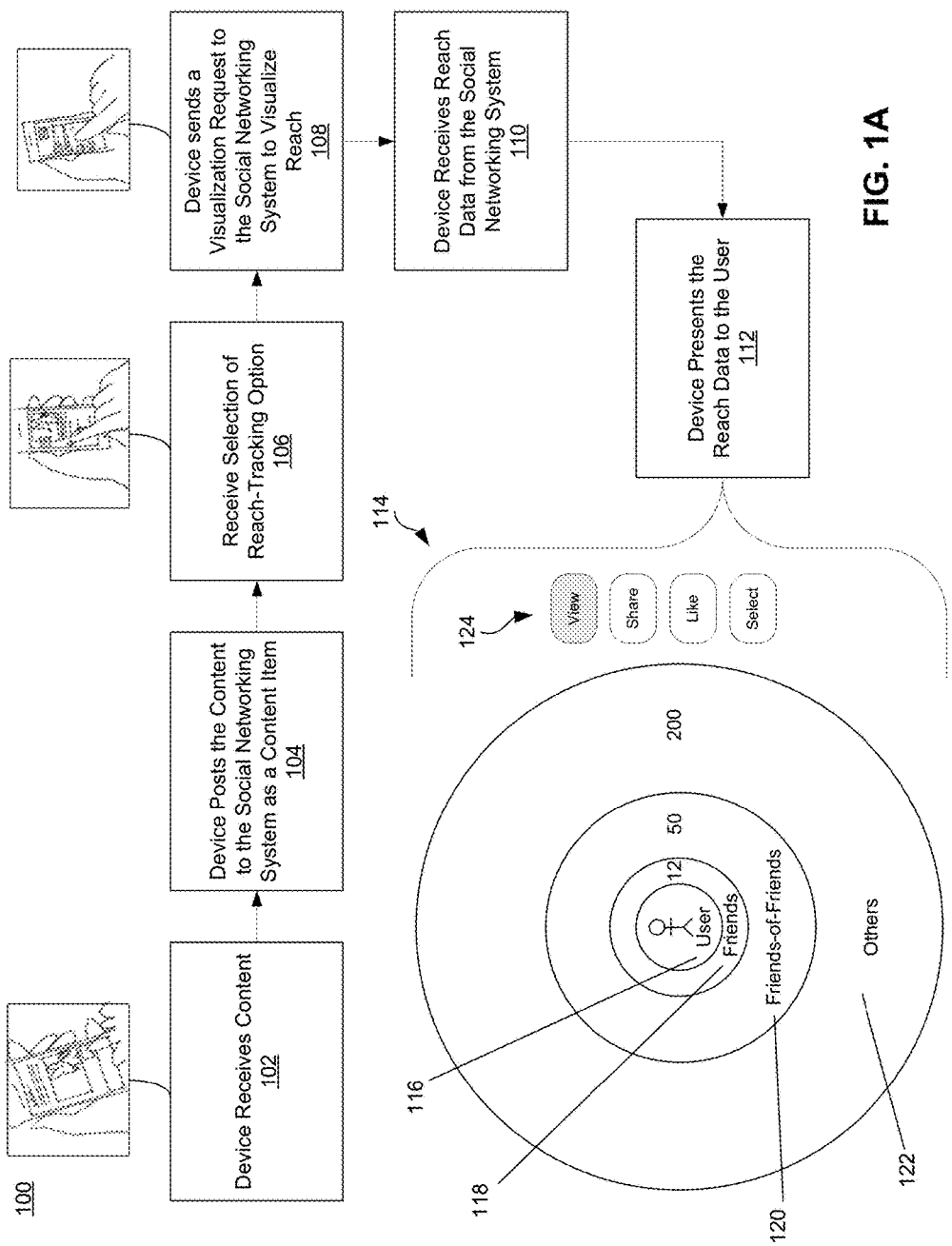
FIG. 1A is a block diagram illustrating a process of visualizing content item propagation within a social networking system, in accordance with an embodiment.

FIG. 1A illustrating a process 100 of visualizing propagation of a content item within a social networking system. A device receives 102 content, or a description of content, for presentation to users of a social networking system. In one embodiment, the device receives 102 a selection of content displayed to a user to present the selected content to social networking system users. For example, the device displays a news story from a data source about a dog that will be euthanized unless adopted. A user of the device may select the news story for distribution via the social networking system. Alternatively, the user creates or identifies a content item using the device, and communicates the content item to the social networking system for presentation to social networking system users.

The content is then posted 104 to the social networking system from the device. The content item posted 104 to the social networking system may be, for example, a copy of the content, a link to the content, the content plus additional content (e.g., story plus a personal plea to adopt the dog), etc. The social networking system compiles tracking data as the content item propagates through the social networking system. The tracking data includes reach data for visually depicting user interactions with a posted content item. Additionally, in some embodiments, some or all of the tracking data may be available to users of the social networking system connected to the user posting 104 the content item.

In alternate embodiments, the user specifies a tracking property of the content item to cause the social networking system to compile tracking data. The tracking property may be set at any time. For example, the user may set the tracking property of the content item while posting 104 or anytime after the content item has been posted.

After the content item has been posted, the user may select 106 a reach-tracking option associated with the posted content item. The reach-tracking option allows a user to receive one or more reach metrics associated with posted content items, allowing the user to ascertain the reach of the content item to other users. For example, the user may want to know how many people have actually viewed, liked, shared, or selected the posted content item. Reach metrics are discussed in detail below in conjunction with FIG. 3, and also described in U.S. application Ser. No. 13/229,515 (the '515 application), filed on Sep. 9, 2011, which is hereby incorporated by reference in its entirety.

In some embodiments, a metric-tracking option is associated with the content item. The metric-tracking option allows a user to indicate visualization of one or more metrics that are associated with the posted content item and/or derivatives of that content item. For example, in addition to reach metrics, the user may track virality metrics, engagement metrics, conversion metrics, location metrics, storyteller metrics, or some combination thereof.

After selecting 106 the reach-tracking option, the device sends 108 a visualization request to the social networking system. As discussed in detail below in conjunction with FIG. 3, the visualization request may include one or more request parameters specifying conditions associated with the visualization request. For example, a request parameter specifies a type of metric to be visually described to the user (e.g., reach, virality, etc.).

The social networking system determines reach data using tracking data compiled for the content item and provides the reach data to the requesting device. The social networking system monitors the propagation of the content item among users of the social networking system using label objects and edge objects as described in the '515 application. In brief, label objects include tracking information associated with a tracked content item and users' actions relative to that content item. Label objects tracking different generations of the same content item may be generated. For example, a first label item may be associated with a content item posted by a user. A second label item may be associated with a re-posting of the content item with a personal narrative by a different user. A third label item may be associated with another user that views the re-posted content to identify the other user's action relative to the content item. Thus, the social networking system may track various generations of content originating from a single content item. Edge objects store information about users' connections on the social networking system. Information in an edge object may include the interactions between the user and other objects on the social networking system, which include wall posts, comments on photos, geographic places, and tags in photos. Label objects may be associated with edge objects created from the actions performed on objects.

The social networking system uses the tracking information in the label and edge objects to determine one or more metrics, such as reach metrics. Reach metrics approximate the number of unique users performing a particular action on a content item and/or derivatives of the content item. For example, reach metrics may track viewing a content item, sharing a content item, expressing a preference of a content item ("liking" the content item), selecting a content item, or some combination thereof. In some embodiments, the social networking system dynamically determines reach metrics as users perform actions. Alternatively, the social networking system determines the reach metrics in response to receiving a visualization request. In some embodiments, the social networking system may also determine virality metrics, engagement metrics, conversion metrics, location metrics, storyteller metrics, or some combination thereof.

The social networking system formats the reach metrics into reach data in accordance with the visualization request. For example, the social networking system filters one or more reach metrics based on request parameters (e.g., remove location information) in the visualization request. Reach data may calculate direct reach and indirect reach of a content item in the social networking system. Direct reach of a content item is information associated with one or more users directly connected to the user and performing a type of interaction, or types of interactions, with the content item. Indirect reach of a content item is information associated one or more users that are indirectly connected to the user and that perform a type of interaction, or types of interactions, with the content item. The social networking system then provides the reach data to the requesting device. Additionally, parameters of the visualization request may indicate whether the social networking system provides a data graph to the device, or raw data which the device may use to populate a data graph. After receiving 110 the reach data from the social networking system, the device presents 112 the received reach data to the user. In some embodiments, the social networking system may also present other metrics based on data received from the social networking system (e.g., virality metrics from virality data, engagement metrics from engagement data, etc).

In the example shown by FIG. 1A, reach data is presented 112 to the user via a data graph 114. The data graph 114 generally shows a relationship between the content item posted by the user and its propagation (and/or propagation of its derivatives) throughout the social networking system. For example, the data graph 114 depicts four concentric circles that represent a degree of connection between users interacting with the content item and the user posting the content item. In FIG. 1, these concentric circles are identified as: user circle 116, friends circle 118, friends-of-friends circle 120, and others circle 122. User circle 116 represents the user's posting of the content item. The friends circle 118 represents the number of users that have performed a particular action on the content item (or derivatives thereof) and that are directly linked to the user who posted the content. The friends-of-friends circle 120 represents the number of users that have performed the particular action on the content item (or derivatives thereof) that are directly linked to a friend of the user who posted the original content item, but not directly linked to that user. The others circle 122 represents the number of the users that performed the particular action on the content items (or derivatives thereof) that are directly or indirectly linked to friends-of-friends and are not directly linked to the user who posted the original content item or to friends of the user. An action may be, for example, viewing the content item, sharing the content item, liking the content item, selecting a content item, some combination thereof, etc.

In this embodiment, the data graph 114 includes soft-buttons 124, or other interface elements, for selecting a particular action of interest to the user. The soft-buttons 124 may, for example, correspond to particular actions performed on the content item and/or derivatives thereof. As shown in FIG. 1A, the "View" soft button is selected. Accordingly, the friends circle 118, the friends-of-friends circle 120, and the others circle 122 display reach data associated with the number of users who have viewed the posted content item and/or derivatives thereof. In the illustrated example, 12 friends, 50 friends-of-friends, and 200 others have viewed the content item or derivatives of the posted content item. In some embodiments, one or more of the soft buttons may present information describing one or more metrics. For example, a soft button may include: metric data associated with the content item and/or derivatives of the content item and an action associated with the soft button, a sum of metric data associated with the content item and derivatives of the content item and an action associated with the soft button, or some combination thereof.

In one embodiment, the user may select one or more of the soft buttons at any time to change the presented reach data. Further, the relative sizes of the friends circle 118, the friends-of-friends circle 120, and the others circle 122, may vary depending on the number of users associated with each of the concentric circles to more clearly identify the number of users associated with different concentric circles. For example, in the example shown by FIG. 1A, the others circle 122 has the largest number (i.e., 122) of users associated with it. However, if 40 users are associated with the others circle 122, the others circle 122 would be smaller than the friend-of friends circle 120, which is associated with 50 users in FIG. 1A, but larger than the friends circle 118, which is associated with 12 users in FIG. 1A.

In some embodiments, the device automatically presents 112 the reach data in a particular format (e.g., data graph 114). For example, one or more settings stored by the device or by the social networking system specify the format for presentation of the reach data. In other embodiments, the device prompts the user to specify a format for presentation of the reach data when the reach data is received 110. Additionally, the user may modify the format with which the reach data is presented at any time. For example, the device may prompt the user to choose a particular format for a data graph before displaying the reach data and may allow the user to choose a different format while the data graph is displayed. Additionally, the device may allow a user to set up a default format for presentation of reach data unless a user selection of a different format is received.

Figure 1B:
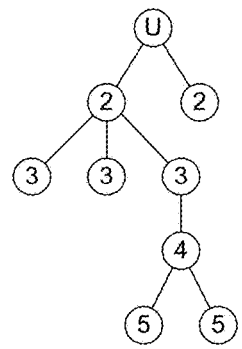
FIG. 1B is an example data graph for visualizing content item propagation within a social networking system, in accordance with an embodiment.
Figure 1C:
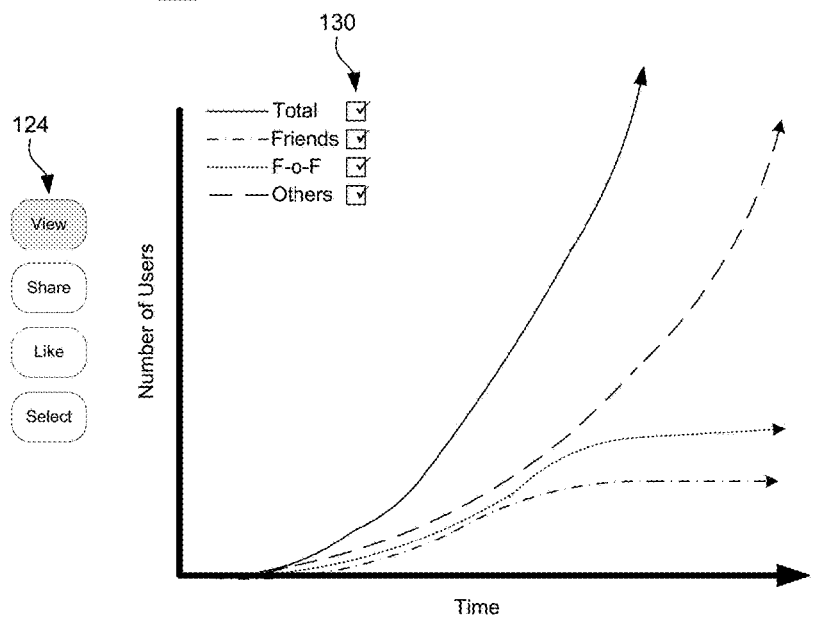
FIG. 1C is an alternative type of data graph for visualizing content item propagation within a social networking system, in accordance with an embodiment.

Alternate formats for data graphs of reach data are illustrated in FIGS. 1B and 1C. FIG. 1B is a data graph 126 visualizing propagation of a content item within a social networking system using a number of connected nodes showing degrees of connections between the users providing the content item and users interacting with the content item and/or derivatives of the content item. Each node in the data graph 126 is identified by a number representing how closely the user represented by the node is connected to the user posting the content item. For example, the second tier (i.e., nodes are labeled 2) are users connected to the user posting the content item, the third tier are users connected to a user connected to the user posting the content, and tiers above the third tier are "others," as described above in conjunction with FIG. 1A. Additionally, the links between nodes represent a particular interaction between two nodes, such as when a user expresses an interest in a content item shared by another user.

FIG. 1C is another format for a data graph 128 showing propagation of a content item and/or its derivatives within a social networking system. The data graph 128 illustrates reach data using a 2-D regular grid. Aspects of the reach data displayed by the data graph 128 are determined by a user's selection of one or more soft buttons or other user-provided input. The example of FIG. 1C shows a data graph 128 depicting how a number of users connected to the user posting a content item, users connected to a user that is connected to the user posting the content item, other users, and a total number of users that view a particular content item change over time. Soft buttons 124, or any other suitable input mechanism, allow the user control over aspects of the reach data that are presented. Additionally, the user may further refine presentation of reach data 128 through one or more selection boxes 130. In one embodiment, the selection boxes 130 identify the types of users presented on the data graph 128, such as whether data describing users connected to the user posting the content item, users connected to a user that is connected to the user posting the content item, other users, a total number of users, or any combination thereof is displayed. Any other suitable data graph format may be used to present reach data, other metric data, or some combinations thereof, to the user.

System Architecture

Figure 2:
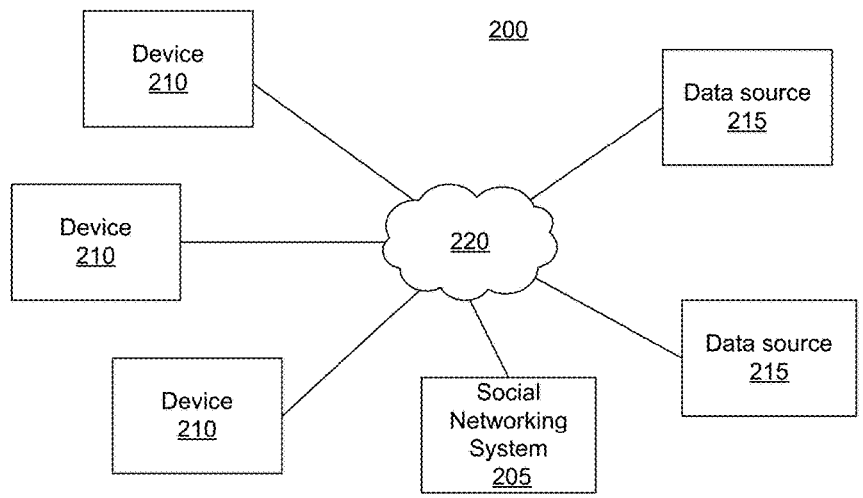
FIG. 2 illustrates a block diagram of a system environment for a social network system, in accordance with an embodiment.

FIG. 2 illustrates a block diagram of a system environment 200 for a social networking system 205. The system environment 200 includes the social networking system 205, one or more devices 210, and one or more data sources 215, and a network 220. In various embodiments, the system environment 200 may be organized in an alternative topology or configuration, and include different and/or additional modules.

The devices 210 comprise one or more computing devices capable of processing data as well as transmitting and/or receiving data via the network 220. Examples of a device 210 include a personal digital assistant (PDA), a mobile telephone, a laptop computer, a desktop computer, or any other suitable computing device. A device 210 may execute a social networking application allowing a social networking system user to exchange data with the social networking system 205 via a device 210 and the network 220. Alternatively, a social networking system user accesses the social networking system 205 via a browser executing by the device 210. User identifying (ID) information for users of the device 210 previously accessing the social networking system 205 may be stored by the device 210.

The devices 210 are configured to communicate with the social networking system 205 and/or other devices via the network 220. In one embodiment, the network 220 uses standard communications technologies and/or protocols. Thus, the network 220 may include wired and/or wireless communication channels using technologies such as Ethernet, 802.11 family of standards, worldwide interoperability for microwave access (WiMAX), 3G, 4G, CDMA, digital subscriber line (DSL), etc. Examples of networking protocols used by the network 220 include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 220 may be represented using technologies and/or formats including the hypertext markup language (HTML) and the extensible markup language (XML). In addition, all or some of the communication channels may be encrypted using conventional encryption technologies such as secure sockets layer (SSL), transport layer security (TLS), and Internet Protocol security (IPsec). Data sources 215 are sources of content communicating with the social networking system 205 and/or one or more devices 210 via the network 220. Examples of a data source 215 include a news agency website, a company website, or any other source of content.

Figure 3:
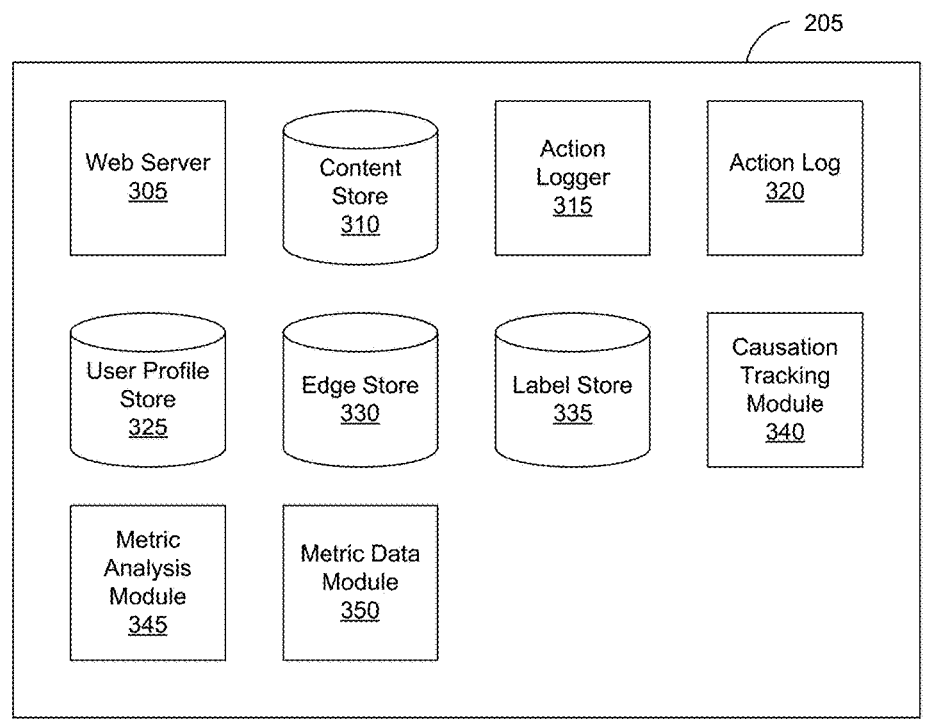
FIG. 3 is a block diagram of system architecture of a social networking system, in accordance with an embodiment.

The social networking system 205 communicates with one or more devices 205 and/or one or more data sources 215 via the network 220. FIG. 3 is an example block diagram of a system architecture of the social networking system 205. The social networking system 205 includes a web server 305, a content store 310, an action logger 315, an action log 320, a user profile store 325, an edge store 330, a label store 335, a causation tracking module 340, a metric analysis module 345, and a reach data module 350. In other embodiments, the social networking system 205 may include additional, fewer, or different modules for various applications. Conventional components such as network interfaces, security functions, load balancers, failover servers, management and network operations consoles, and the like are not shown so as to not obscure the details of the system.

The web server 305 links the social networking system 205 via the network 220 to one or more devices 210; the web server 305 serves web pages, as well as other web-related content, such as JAVA®, FLASH®, XML, and so forth. The web server 305 may provide the functionality of receiving and routing messages between the social networking system 205 and the devices 210, for example, visualization requests, metric data, instant messages, queued messages (e.g., email), text and SMS (short message service) messages, or messages sent using any other suitable messaging technique. The user may send a request to the web server 305 to upload information, for example, images or videos that are stored in the content store 212 and/or data source 215. Additionally, the web server 305 may provide application programming interface (API) functionality to send data directly to native user device operating systems, such as IOS®, ANDROID™, WEBOS®, and RIM.

The content store 310 stores content items associated with a user profile, such as images, videos, and audio files. Content items from the content store 310 may be displayed when a user profile is viewed or when other content associated with the user profile is viewed. For example, displayed content items may show images or video associated with a user profile or show text describing a user's status. Additionally, other content items included in the content store 310 may facilitate user engagement by encouraging a user to expand his connections to other users, to invite new users to the system, or to increase interaction with the social networking system 205 by displaying content related to users, objects, activities, or functionalities of the social networking system 205. Examples of content items include: suggested connections to users, suggestions to perform actions, media provided to the social networking system 205, media maintained by the social networking system 205 (e.g., pictures or videos), status messages or links posted by users to the social networking system 205, events, groups, pages (e.g., representing an organization or commercial entity), and any other content provided by or accessible via the social networking system 205.

The action logger 315 receives communications from the web server 305 about user actions on and/or off the social networking system 205. The action logger 315 populates the action log 320 with information about user actions to track them. Examples of actions include: adding a connection to another user, sending a message to another user, uploading an image, reading a message from another user, viewing content associated with a user, attending an event, or other suitable actions. In addition, a number of actions described in connection with other objects are directed at particular users, and are associated with the particular users as well.

The action log 320 stores information describing user actions performed internal to the social networking system 205 as well as user actions performed on external websites that communicate information to the social networking system 205. As mentioned above, users may interact with various objects on the social networking system 205, including commenting on posts, sharing links, and checking-in to physical locations via a device 210. The action log 320 may also include user actions on external websites. For example, an e-commerce website that primarily sells luxury shoes at bargain prices may recognize a user of a social networking system 205 through website plug-ins that enable the e-commerce website to identify the user. Because users of the social networking system 205 are uniquely identifiable, e-commerce websites, such as this luxury shoe reseller, may use the information about these users as they visit their websites. The action log 320 records data about these users, including viewing histories, content items that were clicked on, purchasing activity, and buying patterns.

User account information and other information related to a user are stored in the user profile store 325. The user profiles stored in user profile store 325 describe the users of the social networking system 205, including biographic, demographic, and other types of descriptive information, such as work experience, educational history, gender, hobbies or preferences, location, and the like. A user profile may also store other information provided by the user, for example, default formats for data graphs, images, videos, etc. In certain embodiments, images of users may be tagged with information identifying the social networking system users displayed in an image. Additional information that may be included in a user profile includes age, gender, interests, geographic location, email addresses, credit card information, and other personalized information. The user profile store 305 also maintains references to the actions stored in the action log and performed on objects in the content store 310.

The edge store 330 stores edges describing connections between users and other objects on the social networking system 205. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 205, such as expressing interest in a page on the social networking system 205, sharing a link with other users of the social networking system 205, and commenting on posts made by other users of the social networking system 205. The information about an edge, such as affinity scores for objects, interests, and other users, is stored in the edge store 330.

The label store 335 stores label objects including tracking information associated with a tracked content item and users' actions relative to the content item. Additionally, the social networking system 205 may create label objects tracking different generations of a content item. Label objects may be associated with edge objects created as a result of the actions performed on content items. Label objects are further described in U.S. application Ser. No. 13/229,515 (the '515 application), filed on Sep. 9, 2011, which is hereby incorporated by reference in its entirety.

The causation tracking module 340 generates label objects, stored in the label store 335, associated with edge objects for user actions. The label objects include identifiers for content items presented to the user performing an action prior to the action being performed. When generating a label object, the causation tracking module 340 may also identify additional label objects associated additional edges associated with the content item presented to the user. Hence, if a content item was generated as a result of a prior user action, a label object identifying the user and the action generating the content item is generated and stored in the label store 335. Subsequently, if the content item is provided to an additional user that performs an action after being presented with the content item, an additional label object describing the action by the additional user is generated and associated with the label object describing the action generating the content item by the causation tracking module 340.

The metric analysis module 345 determines various metrics from label objects generated by the causation tracking module 340. Examples of metrics generated by the metric analysis module 345 include reach metrics, virality metrics, engagement metrics, conversion metrics, location metrics, and storyteller metrics. A reach metric identifies a number of unique users performing a particular action on a content item and/or derivatives of the content item. For example, a reach metric tracks users viewing a content item, sharing a content item, liking a content item, selecting a content item, or performing other suitable actions with a content item. A reach metric may be segmented based on demographics, geographic location, types of user actions, interests of users, and other user characteristics. A virality metric describes how quickly a content item was distributed throughout the social networking system 205, the replication rate of a content item over time. Virality metrics may be compared for different content items. Additional details about a reach metric, a virality metric, and other metrics (e.g., engagement and storyteller) are provided in the '515 application.

The metric data module 350 processes visualization requests received from devices 210 and creates metric data from the metric analysis module 345. Metric data is generated from formatting one or more metrics from the metric analysis module 345 for delivery to the requesting device 210 based on a visualization request. For example, reach data is generated from one or more reach metric(s) formatted for delivery to a device 210 from which the visualization request is received based on information in the visualization request. As noted above, a request to visualize a particular data type, such as reach data, includes one or more request parameters. Examples request parameters specify one or more of a data type, a graphic type, a metric type, one or more filters, or other suitable data. A data type specifies whether the device 210 requests raw values that the device 210 uses to create a data graph or whether the device 210 requests a data graph generated by the social networking system 205. Graphic type identifies a format or type of a graph used to display received metric data. In some embodiments, a graphic type specification identifies a default format associated with a user that may be stored in the user profile store 325. One or more filters identify limits on the metric data that is visualized. For example, a user may not be interested in the geographic locations of users when displaying reach data, and provides one or more filters to remove the geographic locations of users. Based on the visualization request, the metric data module 350 retrieves one or more metrics from metric analysis module 345 and formats the retrieved metric based on the visualization request parameters. For example, metric data module 350 filters the raw data from the retrieved metric based on parameters in the visualization request. Generated metric data is communicated to the web server 305 for communication to the device 210 from which the visualization request was received.

If a social networking system user posts a derivative of a previously posted content item, in some embodiments the metric data module 345 provides metric data associated with the content item and with the derivative of the content item. For example, the metric data module 345 may communicate metric data to a device 210 so that the user associated with the device 210 views interactions with the content item by social networking system after a derivative of the content item is posted, but has limited visibility to interactions with the content item prior to posting of the derivative of the content item As another example, the provided metric data allows a user of the device 210 to view interactions with the content item before and after posting of a derivative of the content item.

Visualizing Reach of a Content Item within the Social Networking System

Figure 4:
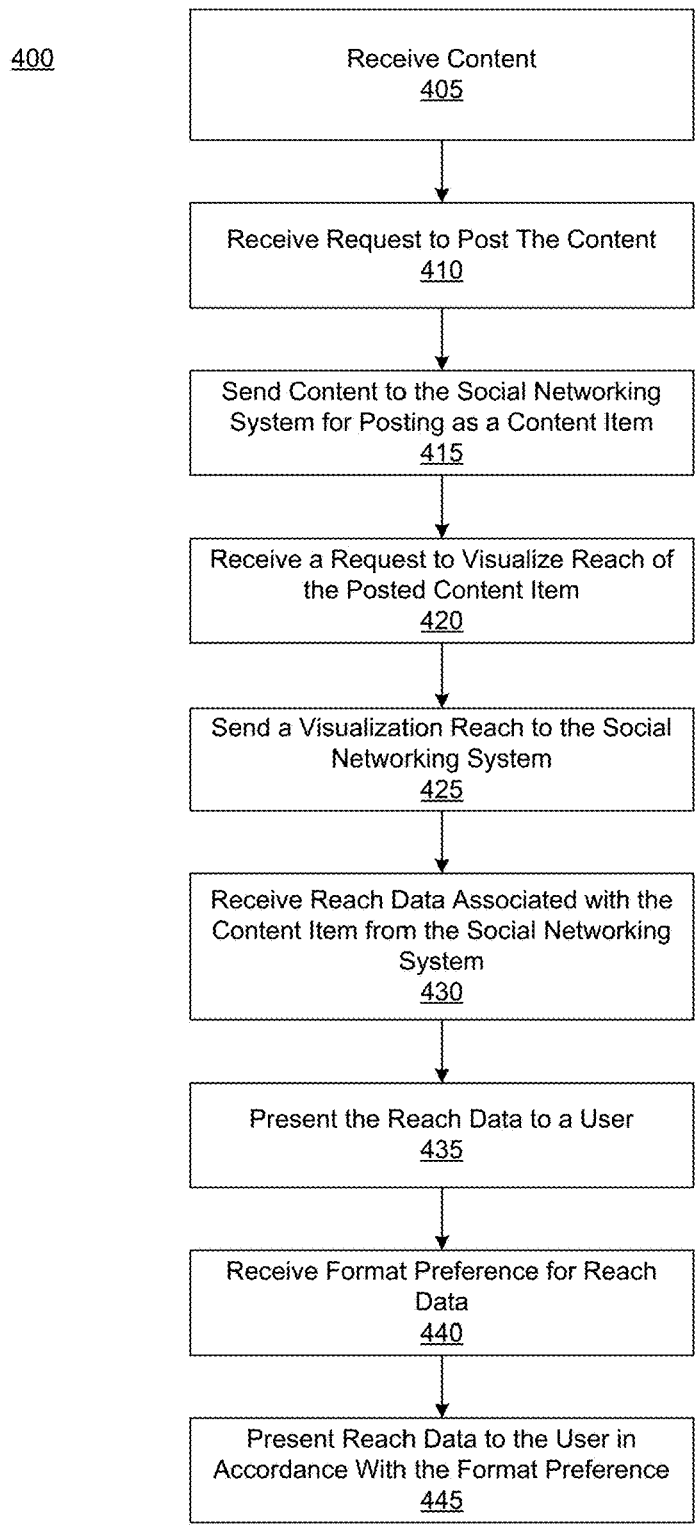
FIG. 4 is a flowchart of a process for visualizing reach of a content item, in accordance with an embodiment.

FIG. 4 illustrates a flowchart of one embodiment of a process 400 for visualizing reach of a content item distributed via the social networking system 205. A device 210 receives 405 content or a description of content from a user of the social networking system 205. For example, the user manually loads the content to the device 210, stores the content from a data source 215 accessed via the device 210, or otherwise communicates the content to the device 210.

The device 210 receives 410 a request to post the content (or re-post a content item) to the social networking system 205, allowing social networking system users to access the content, and sends 415 the content to the social networking system 205 for posting as a content item. For example, device 210 receives 410 the request to post the content and sends the content to post as a content item via a local application or a browser that interfaces with the social networking system 205. In some embodiments, the user specifies a tracking property associated with the content item to cause the social networking system 205 to generate tracking data for the content item. In such cases, the tracking property may be set when the content is posted or after the content has been posted. Alternatively, the social networking system 205 generates tracking data when the content is received by the social networking system 205. In cases where the user is re-posting a content item associated with a different user, the device 210 sends 415 a pointer to the posted content item or the posted content item to the social networking system 205.

After the content item is presented via the social networking system 205, the device 210 receives 420 a request to visualize the reach of the posted content item. For example, the user accesses the social networking system 205 and selects a reach-tracking option associated with a particular content item. The device 210 sends 425 a visualization request to the social networking system 205. As discussed above in conjunction with FIGS. 1A and 3, the visualization request includes one or more parameters. The social networking system 205 determines the reach data as further described in conjunction with FIG. 3 and FIG. 5, and communicates the reach data to the device 210.

The device 210 receives 430 the reach data associated with the content item and/or derivatives thereof from the social networking system 205 and presents 435 the reach data to the user. For example, the reach data is presented 435 using a default data graph format. In one embodiment, the device 210 receives 440 a format preference for modifying display of the reach data. As discussed above in conjunction with FIGS. 1A and 3 the reach data may include multiple aspects for display. For example, referring to FIGS. 1A-1C, a user selects a soft button to change the action presented 435 to the user via the device 210. Or, the user may change the display of the reach data to a different type of data graph. The device 210 then present 445 the reach data to the user based on the received format preference. While FIG. 4 is directed toward presenting reach data, other metric data may be displayed using a similar process.

Creating Reach Data for Content Items

Figure 5:
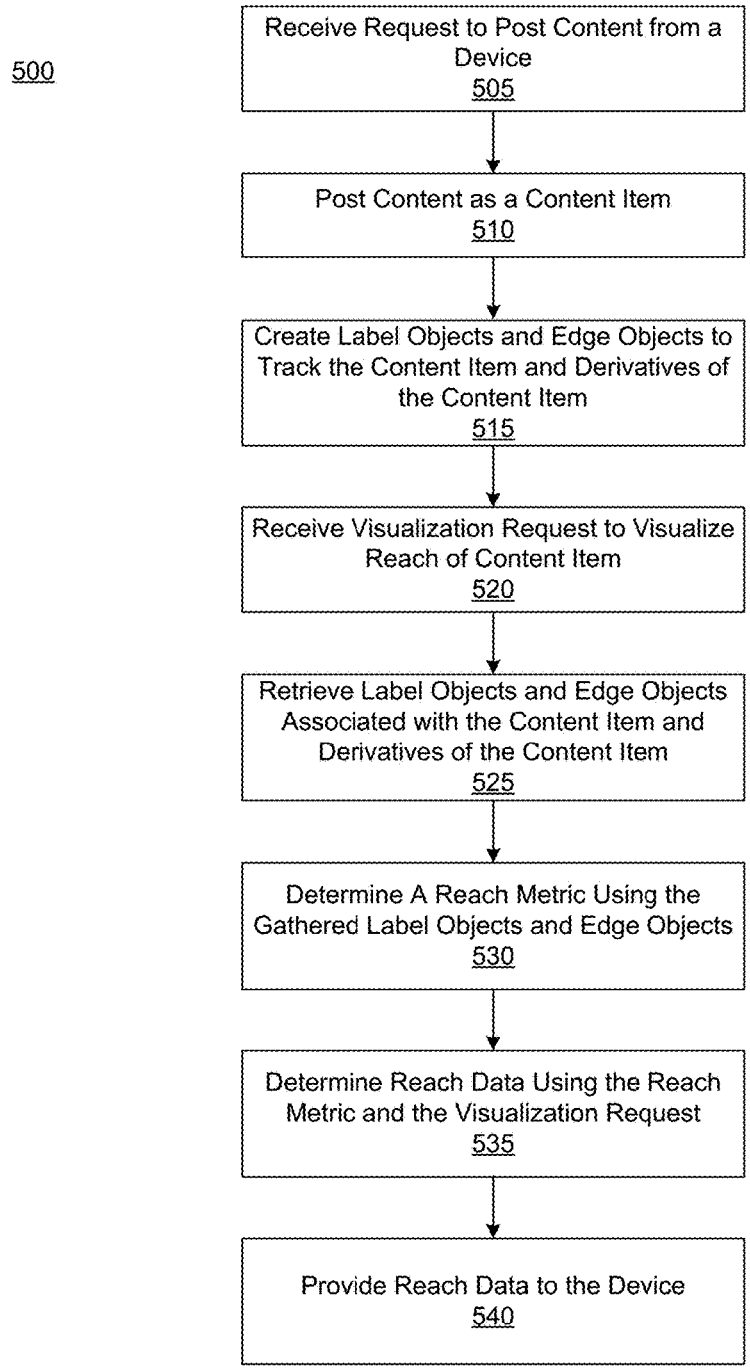
FIG. 5 is a flowchart of a process for generating reach data describing interactions with a content item by social networking system users, in accordance with an embodiment.

FIG. 5 illustrates one embodiment of a process 500 for creating and presenting data visualizing reach of a content item within a social networking system 205. The social networking system 205 receives 505 a request to post content, or to repost a content item, from a device 210 associated with a user of the social networking system 205. Based on the request, the content item is posted 510 by the social networking system as a content item, allowing social networking system users to access the content item 205. For example, the content item is presented to users of the social networking system 205 connected to the user from which the request to post content was received 505. Additionally, the social networking system 205 may re-post 510 a content item that has been previously posted by another user of the social networking system 205.

The social networking system creates 515 label objects and edge objects tracking interactions with the content item and/or derivatives of the content item by social networking system users. Creation of label objects and edge objects is further described in U.S. application Ser. No. 13/229,515, filed on Sep. 9, 2011, which is hereby incorporated by reference in its entirety. In alternate embodiments, the social networking system 205 does not create 515 label objects and/or edge objects until a tracking property of the posted content item is set. For example, the user selects the tracking property of the content item while posting the content.

As users presented with the posted content item interact with the content item, the content item or communications associated with the content item are sent to users of the social networking system connected to the users presented with the posted content item. This allows the users initially viewing the content item to share the content item with other users or to notify other users to which they are connected of their interactions with the content item. Label objects tracking the communications associated with the content item and/or tracking interactions with the content item by the users of the social networking system connected to the users initially presented with the posted content item are created 515. This allows the social networking system 205 to monitor interactions with the content item as social networking system users communicate about the content item or distribute the content item.

After presentation of the content item via the social networking system 205, the social networking system 205 receives 520 a visualization request to visualize the reach of the posted content item. The visualization request may include one or more parameters, as discussed above in conjunction with FIG. 3. The visualization request may identify visualization of the reach of the posted content item or may identify visualization of other metrics, such as virality, engagement, or other suitable metric.

Label objects and edge objects associated with the content item and derivatives of the content item are retrieved 525 from the edge store 330 and from the label store 335. Using the retrieved label objects and edge objects, the social networking system 205 determines 530 a reach metric, as further described in U.S. application Ser. No. 13/229,515, filed on Sep. 9, 2011, which is hereby incorporated by reference in its entirety. For example, users performing actions involving a content item are identified from label objects associated with the content item and data from the edge store 330 identifies connections between users performing actions involving the content item and the user posting the content item. In some embodiments, the social networking system 205 determines other metrics, such as virality metrics, engagement metrics, conversion metrics, location metrics, and storyteller metrics from the retrieved label objects and edge objects.

From the determined reach metric and the visualization request, the social networking system 205 determines 535 reach data. For example, the social networking system determines 535 reach data from a reach metric and one or more parameters specified by the visualization request. The generated reach data is provided 540 to the device 210 for presentation to the user, as described above in conjunction with FIGS. 1A-1C.

The social networking system 205 may receive visualization requests from other users of the social networking system that have posted a derivative of the content item. The metric data provided to users posting a derivative of the content item may vary in different embodiments. For example, metric data provided is provided to a device 210 so that the user associated with the device 210 views interactions with the derivative of the content item after the derivative of the content item is posted, but has limited visibility to interactions with the content item prior to posting of the derivative of the content item As another example, the provided metric data allows a user of the device 210 to view interactions with the content item before and after posting of the derivative of the content item.

SUMMARY

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method comprising:
   determining a direct reach of a publication of a content item in a social networking system based on a first set of users who are directly connected to a posting user who posted the publication of the content item in the social networking system so as to make the content item visible, through the social networking system, to the first set of users through the publication of the content item, the direct reach comprising a total number of the first set of users that interacted with the publication of the content item, the first set of users being friends of the posting user in a context of the social networking system;
   determining an indirect reach of the publication of the content item in the social networking system based on a second set of users who are indirectly connected to the posting user in the social networking system, the indirect reach comprising a total number of the second set of users that interacted with a derivative of the publication of the content item without interacting with the publication of the content item itself, the derivative of the publication of the content item being a modified version of the publication of the content item posted by the posting user and modified by one or more of the first set of users, as a result of the posting user posting the publication of the content item in the social networking system, the second set of users not being friends of the posting user in the context of the social networking system; and
   sending for display a data graph to the posting user, the data graph based in part on reach data about the reach of the publication of the content item, the reach data comprising the determined direct reach and the determined indirect reach, the data graph presenting the total number of the first set of users that interacted with the publication of the content item and the total number of the second set of users that interacted with the derivative of the publication of the content item as a result of the posting user providing the publication of the content item to the social networking system.

2. The method of claim 1, wherein the direct reach of the publication of the content item describes a number of users in the first set of users performing a specified type of interaction with the publication of the content item, and the number of users is grouped based on connections between the posting user and the users in the first set of users performing the specified type of interaction with the publication of the content item.

3. The method of claim 1, wherein determining the indirect reach of the publication of the content item in the social networking system based on the second set of users comprises:
   determining information about one or more interactions with the derivative of the publication of the content item by one or more of the second set of users.

4. The method of claim 1, further comprising:
   receiving a request to post the derivative of the publication of the content item from a different posting user of the social networking system;
   sending the derivative of the publication of the content item for display to an additional set of users of the social networking system;
   receiving information about one or more interactions with the derivative of the publication of the content item by one or more of the additional set of users;
   based on one or more of the interactions, sending one or more communications associated with the derivative of the publication of the content item for display to a second additional set of users of the social networking system;
   determining a direct reach of the derivative of the publication of the content item in the social networking system based on the first set of users;
   determining an indirect reach of the derivative of the publication of the content item in the social networking system based on the second set of users; and
   sending for display to the different posting user information about the reach of the derivative of the publication of the content item, the reach comprising the determined direct reach and the determined indirect reach.

5. The method of claim 4, further comprising:
   modifying the information about the reach of the publication of the content item based on the information about the reach of the derivative of the publication of the content item.

6. A method comprising:
receiving a request from a posting user of a social networking system for reach information about a publication of a content item, the publication of the content item making the content item visible, through the social networking system, to a first set of users through the publication of the content item;
determining reach data of the publication of the content item comprising information about a total number of the first set of users that interacted with the publication of the content item and a total number of a second set of users that interacted with a derivative of the publication of the content item without interacting with the publication of the content item itself, the derivative of the publication of the content item being a modified version of the publication of the content item posted by the posting user and modified by one or more of the first set of users, as a result of the posting user posting the publication of the content item in the social networking system, the reach data describing direct reach of the publication of the content item and indirect reach of the publication of the content item, the direct reach of the publication of the content item describing a number of users in the first set of users performing a specified type of interaction with the publication of the content item, and the number of users is grouped based on connections between the posting user and the users in the first set of users performing the specified type of interaction with the content item, the first set of users being friends of the posting user and the second set of users not being friends of the posting user in a context of the social networking system; and
sending for display a data graph to the posting user, the data graph based in part on reach data about the reach of the publication of the content item, the reach data comprising the determined direct reach and the determined indirect reach, the data graph presenting the total number of the first set of users that interacted with the publication of the content item and the total number of the second set of users that interacted with the derivative of the publication of the content item as a result of the posting user providing the publication of the content item to the social networking system.

7. The method of claim 6, wherein the request includes one or more parameters selected from the group consisting of: a data type, a graphic type, a metric type, one or more filter criteria, and any combination thereof.

8. The method of claim 6, further comprising:
receiving a request to post the derivative of the publication of the content item from a different posting user of the social networking system;
providing the derivative of the publication of the content item for presentation to an additional set of users of the social networking system that are connected to the different posting user;
receiving information about one or more interactions with the derivative of the publication of the content item by one or more of the additional set of users;
providing the derivative of the publication content item for presentation to a second additional set of users of the social networking system that are connected to one or more of the additional set of users that interacted with the derivative of the publication of the content item;
receiving information about one or more interactions with the derivative of the publication of the content item from one or more of the second additional set of users;
receiving a request from the different posting user for reach information about the derivative of the publication of the content item;
determining reach data of the derivative of the publication of the content item comprising information about a number of the additional set of users that interacted with the derivative of the publication of the content item and a number of the second additional set of users that interacted with the derivative of the publication of the content item; and
sending the reach data for display to the different posting user.

9. The method of claim 8, further comprising:
modifying the reach data based on the reach data of the derivative of the publication of the content item.

10. The method of claim 6, wherein the type of interaction is specified by the request with the publication of the content item.

11. The method of claim 6, wherein the reach data identifies a number of the first set of users that interacted with the publication of the content item having a type of connection to the posting user, the type of connection identified by the request.

12. The method of claim 11, wherein the reach data identifies a number of the second set of users that interacted with the derivative of the publication of the content item having the type of connection to the posting user.

13. A method comprising:
receiving a request to visualize interactions between a publication of a content item posted by a posting user of a social networking system and other users of the social networking system, the publication of the content item making the content item visible, through the social networking system, to a first set of users, the first set of users being friends of the posting user in a context of the social networking system;
sending the request to the social networking system;
determining data associated with the publication of the content item identifying social networking system users interacting with the publication of the content item and interactions with the publication of the content item, the determined data based in part on reach data received from the social networking system, the reach data comprising: direct reach data about the reach of the publication of the content item comprising a total number of the first set of users that interacted with the publication of the content item by interacting with the publication of the content item and are directly connected to the user in the social networking system, the direct reach of the publication of the content item describing a number of users in the first set of users performing a specified type of interaction with the publication of the content item, and the number of users is grouped based on connections between the user and the users in the first set of users performing the specified type of interaction with the publication of the content item, and indirect reach data about the reach of the publication of the content item comprising a total number of a second set of users who are connected to one or more of the first set of users that interacted with a derivative of the publication of the content item without interacting with the publication of the content item itself, the derivative of the publication of the content item being a modified version of the publication of the content item posted by the posting user and modified by one or more of the first set of users, as a result of the user providing the publication of the content item to the social networking system, the second set of users not being friends of the posting user in the context of the social networking system; and presenting the data associated with the publication of the content item to the user in a data graph, the data including the total number of the first set of users that interacted with the publication of the content item and the total number of the second set of users that interacted with the derivative of the publication of the content item as a result of the user providing the content to the social networking system.

14. The method of claim 13, wherein the data identifies a number of unique social networking system users performing the specified type of interaction with the publication of the content item.

15. The method of claim 14, wherein the type of interaction is selected from a group consisting of: sharing, selecting, viewing, expressing a preference, and any combination thereof.

16. The method of claim 14, wherein the data identifies a rate at which the publication of the content item is distributed to users of the social networking system.

* * * * *